(12) United States Patent
Hsu et al.

(10) Patent No.: US 7,473,724 B2
(45) Date of Patent: Jan. 6, 2009

(54) PREPARATION OF SILICA REINFORCED POLYISOPRENE-RICH RUBBER COMPOSITION AND TIRE WITH COMPONENT THEREOF

(75) Inventors: Wen-Liang Hsu, Cuyahoga Falls, OH (US); Shingo Futamura, Wadsworth, OH (US); Kenneth Allen Bates, Brunswick, OH (US); Adel Farhan Halasa, Bath, OH (US); Kuo-Chih Hua, Richfield, OH (US); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 366 days.

(21) Appl. No.: 11/058,531

(22) Filed: Feb. 15, 2005

(65) Prior Publication Data

US 2006/0183831 A1    Aug. 17, 2006

(51) Int. Cl.
*C08K 5/15* (2006.01)
(52) U.S. Cl. .................................. 524/114; 524/385
(58) Field of Classification Search .............. 524/114, 524/385
See application file for complete search history.

(56) References Cited

U.S. PATENT DOCUMENTS

| | | | |
|---|---|---|---|
| 6,239,203 B1 | 5/2001 | Sandstrom et al. | 524/385 |
| 6,737,466 B2 * | 5/2004 | Schaal et al. | 524/492 |
| 2004/0254301 A1 * | 12/2004 | Tsukimawashi et al. | 525/271 |

* cited by examiner

*Primary Examiner*—Peter D Mulcahy
(74) *Attorney, Agent, or Firm*—Henry C. Young, Jr.

(57) ABSTRACT

This invention relates to the preparation of a cis 1,4-polyisoprene rubber-rich rubber composition containing precipitated silica which has been pre-treated with a fatty alcohol and/or epoxidized soybean oil together with an organosilane containing polysulfide coupling agent and to tires having at least one component comprised of such rubber composition. The invention particularly relates to a process of (a) preparing a natural rubber-rich rubber composition comprised of pretreating precipitated silica aggregates prior to blending with, or in the presence of, dry natural rubber with a fatty alcohol and/or epoxidized soybean oil to the exclusion of sulfur curative for the natural rubber, mixing an organalkoxysiloxane based polysulfide coupling agent with said dry natural rubber coincidentally with or subsequent to said precipitated silica aggregate fatty alcohol and/or epoxidized soybean oil pretreatment to form a composite thereof, to the exclusion of sulfur curative, followed by (b) mixing the resulting rubber mixture with sulfur curative and (c) curing the resulting rubber composition.

17 Claims, No Drawings

PREPARATION OF SILICA REINFORCED POLYISOPRENE-RICH RUBBER COMPOSITION AND TIRE WITH COMPONENT THEREOF

FIELD OF THE INVENTION

This invention relates to the preparation of a cis 1,4-polyisoprene rubber-rich rubber composition containing precipitated silica which has been pre-treated with a fatty alcohol and/or epoxidized soybean oil together with an organosilane containing polysulfide coupling agent and to tires having at least one component comprised of such rubber composition. The invention particularly relates to a process of (a) preparing a natural rubber-rich rubber composition comprised of pre-treating precipitated silica aggregates prior to blending with, or in the presence of, dry natural rubber with a fatty alcohol and/or epoxidized soybean oil to the exclusion of sulfur curative for the natural rubber, mixing an organalkoxysiloxane based polysulfide coupling agent with said dry natural rubber coincidentally with or subsequent to said precipitated silica aggregate fatty alcohol and/or epoxidized soybean oil pre-treatment to form a composite thereof, to the exclusion of sulfur curative, followed by (b) mixing the resulting rubber mixture with sulfur curative and (c) curing the resulting rubber composition.

BACKGROUND OF THE INVENTION

Cis 1,4-polyisoprene rubber-rich, particularly natural rubber-rich rubber compositions, may be prepared, for example, by blending cis 1,4-polyisoprene rubber (e.g. cis 1,4-polyisoprene natural rubber), silica reinforcement, particularly precipitated silica, together with a bifunctional organosiloxane polysulfide coupling agent.

However, it is known that a reduction in various physical properties of natural rubber may occur if the rubber mixture has a relatively high mixing viscosity (e.g. Mooney viscosity), with an accompanying relatively high internal heat generation of the rubber mixture as it is being mixed under high shear conditions, thereby resulting in a relatively rapid internal temperature build up of the rubber mixture.

The inclusion of an alkoxysilane-containing organopolysulfide coupling agent, for example a bis(ω-alkoxysilylalkyl) polysulfide which contains an average of from about 2 to about 4 connecting sulfur atoms in its polysulfidic bridge, in a rubber mixture which contains precipitated silica (with hydroxyl groups such as, for example, silanol groups) and diene-based elastomer-containing rubber mixture can significantly increase the viscosity of the rubber mixture as it is being mixed under high shear conditions in an internal rubber mixer via an interaction of sulfur groups from its polysulfide moiety with the diene-based elastomer(s), a well known effect to those having skill in such art.

Accordingly, it is desired to mix such rubber mixtures more efficiently under high shear conditions in an internal rubber mixer.

Further, the addition of such alkoxysilane-containing polysulfide coupling agents may also release an alcohol during its mixing with the natural rubber-rich rubber composition as it reacts with hydroxyl groups (e.g. silanol groups) contained on the precipitated silica aggregates, a phenomenon also well known to those having skill in such art, which may be objectionable where release of alcohols, particularly volatile alcohols, may not be desired.

U.S. Pat. No. 6,239,203 relates to a method for improving the abrasion resistance of a cured rubber composition for a tire tread by dispersing a $C_{12}$-$C_{36}$ alcohol and sulfur throughout a dry, isolated, sulfur vulcanizable rubber followed by curing the resulting rubber composition. The rubber composition may contain natural rubber. Suitable alcohols for such purpose are indicated to be primary, straight chain, saturated alcohols such as, for example, 1-octadecanol.

In the description of this invention, rubber compound, sulfur-cured rubber compound, rubber composition, rubber blend and compounded rubber terms may be used interchangeably to refer to rubber (e.g. elastomer) which has been mixed with rubber compounding ingredients, unless otherwise indicated. The terms "rubber", "elastomer" and "rubbery polymer" may be used interchangeably unless otherwise indicated. The terms "cured" and "vulcanized" may be used interchangeably unless otherwise indicated.

The term "phr" refers to parts by weight of an ingredient per 100 parts by weight of rubber in a rubber composition.

Such terms are well known to those having skill in such art.

The terms "dry" and "dry, isolated" conjugated diene rubber, including natural rubber (cis 1,4-polyisoprene natural rubber), relates to such rubber in its dry state instead of being in a solvent solution thereof or an aqueous latex thereof.

SUMMARY AND PRACTICE OF THE INVENTION

In accordance with this invention, a process of preparing a rubber composition which comprises the steps of:

(A) blending, based upon parts by weight per 100 parts by weight rubber (phr):
  (1) 100 phr of at least one conjugated diene-based elastomer comprised of:
    (a) from about 50 to about 100, alternately from about 55 to about 95 phr of dry cis 1,4-polyisoprene rubber (natural and/or synthetic cis 1,4-polyisoprene rubber, preferably natural rubber), and
    (b) from zero to about 50, alternately from about 5 to about 45, phr of at least one additional conjugated diene-based elastomer, including copolymers of conjugated dienes,
  (2) from about 25 to about 120 phr of reinforcing filler comprised of:
    (a) from about 20 to about 115 phr of precipitated silica aggregates, and
    (b) from about 5 to about 70 phr of rubber reinforcing carbon black, and
(B) thereafter adding and blending sulfur curative (e.g. sulfur) therewith;

characterized in that said precipitated silica aggregates are treated with a modifier (wetting agent or hydrophobating agent for the precipitated silica aggregates) selected from a fatty alcohol and epoxidized soybean oil and their mixtures in the absence of and prior to said addition of said sulfur curative addition by:

(1) pre-treating said precipitated silica aggregates with said modifier to form a pre-formed silica/modifier composite as a reaction product thereof and blending said pre-formed silica/modifier composite with said conjugated diene-based elastomer(s), followed by reacting said pre-formed silica/modifier composite with a coupling agent in situ within said conjugated diene-based elastomer(s) to form a silica/modifier/coupling agent composite thereof, or (2) reacting said precipitated silica and said modifier in situ within said conjugated diene-based elastomer(s) to form a pre-formed silica/modifier composite as a reaction product thereof, followed by reacting said pre-formed silica/modifier composite with a coupling agent in situ within said conjugated diene-based elastomer(s) to form a silica/modifier/coupling agent composite thereof, or (3) pre-treating said precipitated silica with a combination of said modifier and coupling agent to form a pre-formed silica/modifier/coupling agent composite as a reaction product thereof and blending said pre-formed silica/modifier/coupling agent composite with said conjugated diene-based elastomer(s), or (4) pre-forming a composite of a reaction product of said precipitated silica, coupling agent, said modifier and said diene-based elastomers, or (5) providing said precipitated silica aggregates in a form of a pre-formed silica/coupling agent composite as a reaction product thereof, followed by:

(a) reacting said pre-formed silica/coupling agent composite with said modifier to form a silica/coupling agent/modifier composite as a reaction product thereof and blending said silica/coupling agent/modifier composite with said conjugated diene-based elastomer(s), or (b) reacting said pre-formed silica/coupling agent composite with said modifier in situ within said conjugated diene-based elastomer(s);

wherein said fatty alcohol is selected from at least one of 1-octanol, 1-decanol, 1-dodecanol, 1-tetradecanol, 1-hexadecanol, 1-octadecanol, 1-eicosanol, 1-docosanol, 1-tetracosanol, 1-hexacosanol, or 1-octacosanol, and their mixtures;

wherein said coupling agent is selected from (6) bis(ω-trialkoxysilylalkyl) polysulfide having an average of from about 2 to about 4 connecting sulfur atoms in its polysulfidic bridge, or (7) ω-mercaptoalkyltrialkoxysilane, or (8) ω-mercaptoalkyltrialkoxysilane having its mercapto moiety blocked from pre-reacting with hydroxyl groups (e.g. silanol groups) contained on said precipitated silica aggregates prior to unblocking said blocked mercapto moiety (e.g. at an elevated temperature).

The resulting rubber composition is then sulfur cured at an elevated temperature (e.g. from about 140° C. to about 160° C.).

The process of preparing said rubber composition which further comprises preparing a tire assembly comprised of a rubber tire having a component of said rubber composition and sulfur curing said tire assembly.

In practice, where said coupling agent is said ω-mercaptoalkylalkoxysilane having its mercapto moiety blocked from pre-reacting with said hydroxyl groups contained on said precipitated silica aggregates, said blocked mercapto moiety becomes unblocked (e.g. at said elevated sulfur curing elevated temperature) to enable its mercapto moiety to interact with said conjugated diene-based elastomer(s) and to thereby complete the coupling effect between said precipitated silica and said conjugated diene-based elastomer(s).

In further accordance with this invention, a rubber composition, particularly a sulfur cured rubber composition, is prepared by the process of this invention.

In further accordance with this invention, an article of manufacture is provided having at least one component comprised of said sulfur cured rubber composition.

In additional accordance with this invention a tire is provided having at least one component comprised of said sulfur cured rubber composition.

In further accordance, a tire is provided having a tread comprised of said sulfur cured rubber composition.

While the mechanism, and result, of said treating of said precipitated silica aggregates, or composite of precipitated silica aggregates with said coupling agent, with said modifier either prior to the addition thereof or in situ within said conjugated diene-based elastomer(s), to form a composite thereof, in the absence of and prior to addition of a sulfur curative, may not be fully understood, it appears that, as compared to administering said fatty alcohol pre-treatment of said precipitated silica, that a rubber composition can result which exhibits one or more of (A) improved processability in the sense of reduced Mooney viscosity of the uncured rubber composition considered herein to be a particular benefit for processing cis 1,4-polyisoprene natural rubber-rich composition to promote a reduced hot high shear degradative mixing history for the natural rubber, (B) reduced, or lower, tan delta physical and/or rebound physical property of a sulfur cured rubber composition for a predictive lower rolling resistance for a tire having a tread of such cured rubber composition for a resulting predictive improved vehicular fuel economy for a vehicle with such tires and (C) improved abrasion resistance (DIN abrasion resistance) property for a sulfur cured rubber composition which may be beneficial for a tire having a tread of such cured rubber composition.

Representative of said bis(ω-trialkoxysilylalkyl) polysulfide based silica coupling agent are, for example, bis(ω-trialkoxysilylalkyl) polysulfides having an average of from about 2 to about 4 connecting sulfur atoms in its polysulfidic bridge and preferably an average of from about 2 to about 2.6 or an average of from about 3.3 to about 3.8 connecting sulfur atoms in its polysulfidic bridge:

wherein said alkyl group of said silylalkyl moiety is selected from saturated alkyl groups which contain from 2 to 6 carbon atoms, such as for example and preferably a propyl group, wherein at least one and preferably at least two of the alkyl groups of said trialkoxy moiety are ethyl groups and the remaining alkyl group(s) of said trialkoxy moiety are independently selected from an ethyl group and from a higher saturated alkyl group (e.g. greater number of carbon atoms than an ethyl group) containing from 3 to about 18 carbon atoms, wherein at least one of said higher saturated alkyl groups of said trialkoxy moiety of the coupling agent optionally contains one or more polar functional groups selected from:

(A) pendent polar functional groups selected from ether, amine, ester, ketone, epoxy and hydroxy pendently attached to at least one of said higher alkyl group(s);

(B) polar functional groups contained within at least one of said higher alkyl group(s), (as a part of the alkyl chain, e.g. an ether linkage such as, for example: $SiO-(CH_2)_n-O-CH_2-O-CH_2-$), selected from ether, amine, ester, ketone, epoxy and hydroxy groups.

Such optional polar functional groups pendent to or contained within said higher alkyl group(s) of the trialkoxy moiety of the coupling agent are considered herein as having a capability of promoting the hydrophobacity of the silica surface to which the coupling agent attaches and promoting a reduction of evolution of ethanol from the reaction of ethoxy groups of the coupling agent with hydroxyl groups (e.g. silanol groups) contained on the precipitated silica aggregates.

The said higher alkyl groups of the trialkoxy moiety of the coupling agent, when containing from 3 to and including 8 carbon atoms, may be cyclic in structure and attach to both oxygen atoms linked to silicon of the coupling agent. It is considered therein that the presence of such cyclic alkyl dioxy moieties may also reduce the evolution of ethanol from the reaction of the coupling agent with hydroxyl groups (e.g. silanol groups) contained on the precipitated silica aggregates, and where such bis(ω-trialkoxysilylalkyl) polysulfide is provided in which the silylalkyl moiety is a silylpropyl moiety and the trialkoxy moiety is a triethoxy moiety may be represented as being comprised of a bis(3-triethoxysilylpropyl) polysulfide with the "ω-" antecedent becoming a "3-" antecedent because of the alkyl moiety of the silylalkyl component of the coupling agent being a propyl group.

Representative of said ω-mercaptoalkyltrialkoxysilane based coupling agents are for example, ω-mercaptoalkyltrialkoxysilanes:

wherein the alkyl group is selected from saturated alkyl groups which contain from 2 to 6 carbon atoms, wherein at least one, and alternatively at least two, of the alkyl groups of said trialkoxy moiety is an ethyl group and the remaining alkyl group(s) of said trialkoxy moiety is selected from an ethyl group and from a higher saturated alkyl group (e.g. greater number of carbon atoms than an ethyl group) containing from 3 to about 18 carbon atoms, wherein at least one of said higher saturated alkyl groups of the said trialkoxy moiety of the coupling agent optionally contains one or more polar functional groups selected from:

(A) pendent polar functional groups contained within at least one of said higher alkyl group(s), (B) polar functional groups contained within at least one of said higher alkyl group(s), (as a part of the alkyl chain, e.g. an ether linkage such as, for example: SiO—$(CH_2)_n$—O—$CH_2$—O—$CH_2$—), selected from ether, amine, ester, ketone, epoxy and hydroxy group(s).

Such optional polar functional groups pendent to or contained within said higher alkyl group(s) are considered herein as having a capability of promoting the hydrophobacity of the silica surface to which the coupling agent attaches and, moreover, reducing evolution of ethanol from the reaction of the ethoxy groups of the coupling agent with hydroxyl groups (e.g. silanol groups) contained on the precipitated silica aggregates.

The said higher alkyl groups of the trialkoxy moiety of the coupling agent, when containing from 3 to and including 8 carbon atoms, may be cyclic in structure and attach to both oxygen atoms linked to silicon of the coupling agent. An example of such coupling agent containing a cyclic alkyl group is 3-mercapto-alkyl ethoxy(2-alkyl-1,3-propane di-oxy)silane. It is considered therein that the presence of such cyclic alkyl di-oxy moieties may also reduce the evolution of ethanol from the reaction of the ethoxy groups of the alkoxy moiety of the coupling agent with hydroxyl groups (e.g. silanol groups) contained on the precipitated silica aggregates, and said alkyl moiety is a saturated alkyl group which contains from 2 through 8 carbon atoms such as, for example, propyl, ethyl, butyl, hexyl and octyl groups.

Representative of such ω-mercaptoalkyltrialkoxysilanes are, for example, 3-mercaptopropyltriethoxysilane and 3-mercaptopropyldidodecaoxyethoxysilane.

Representative of said ω-mercaptoalkyltrialkoxysilanes having a blocked mercapto moiety in which its blocked mercapto moiety is unblockable (e.g. at an elevated temperature) to enable its mercapto moiety to interact with said conjugated diene-based elastomer(s) to complete a coupling effect between said precipitated silica and said conjugated diene-based elastomer(s) are, for example, comprised of at least one of 3-octanoylthio-1-propyltrimethoxysilane, 3-octanoylthio-1-propyltriethoxysilane, 3-octanoylthio-1-propylethoxy(2-methyl-1,3-propanedioxyl)silane and their mixtures. Examples and rationale may be found, for example, in U.S. Pat. No. 6,127,468.

Representative of said additional conjugated diene-based elastomers, including copolymers of conjugated dienes are, for example, elastomers selected from at least one of polymers of 1,3-butadiene, copolymers of isoprene and 1,3-butadiene and copolymers of styrene with at least one of isoprene and 1,3-butadiene.

Some representative examples of said additional diene-based elastomers are, for example, cis 1,4-polybutadiene rubber, styrene-butadiene rubber (SBR), styrene-isoprene-butadiene terpolymer rubber (SIBR), styrene-isoprene rubber (SIR) and isoprene-butadiene rubber (IBR) and high vinyl polybutadiene rubber (HVPBD) having a vinyl 1,2-content in a range of from about 30 to about 80 percent.

It should readily be understood by one having skill in the art that said rubber composition can be compounded by methods generally known in the rubber compounding art, such as mixing the various sulfur-vulcanizable constituent diene-based elastomers with various commonly-used additive materials such as, for example, curing aids, such as sulfur, activators, retarders and accelerators, processing additives, such as oils, resins including tackifying resins, plasticizers, fillers, pigments, stearic acid, zinc oxide, waxes, antioxidants and antiozonants, peptizing agents and the aforesaid reinforcing fillers as rubber reinforcing carbon black and synthetic amorphous precipitated silica aggregates. As known to those skilled in the art, depending on the intended use of the sulfur-vulcanizable and sulfur-vulcanized materials (rubbers), the various additives mentioned above are selected and commonly used in conventional amounts unless otherwise indicated herein.

The pneumatic tires are conventionally comprised of a generally toroidal-shaped carcass with an outer circumferential tread, adapted to be ground contacting, spaced beads and sidewalls extending radially from and connecting said tread to said beads.

Typical amounts of antioxidants comprise 1 to about 5 phr. Representative antioxidants may be, for example, diphenyl-p-phenylenediamine and others, such as those disclosed in The Vanderbilt Rubber Handbook (1978), pages 344-346. Suitable antiozonant(s) and waxes, particularly microcrystalline waxes, may be of the type shown in The Vanderbilt Rubber Handbook (1978), pages 346-347. Typical amounts of antiozonants comprise 1 to about 5 phr. Typical amounts of stearic acid comprise 1 to about 3 phr. Typical amounts of zinc oxide comprise 2 to about 5 phr. Typical amounts of waxes comprise 1 to about 5 phr. Typical amounts of peptizers comprise 0.1 to about 1 phr. The presence and relative amounts of the above additives are not normally considered herein as a significant aspect of the present invention.

The vulcanization of the elastomer composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. Such sulfur-vulcanizing agents may normally used are used in an amount ranging from about 0.5 to about 5 phr with a range of from 1.5 to 2.3 being often preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators in which a primary accelerator is generally used in the larger amount (0.5 to 1.0 phr), and a secondary accelerator which is generally used in smaller amounts (0.05-0.50 phr) in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, diphenyl guanidine, thioureas, thiazoles, thiurams, sulfenamides, dithiocarbamates and xanthates. The primary accelerator might be, for example, a sulfenamide such as, for example, N-cyclohexyl-2-sulfenamide. If a second accelerator is used, the secondary accelerator might be selected from, for example, a guanidine, dithiocarbamate or thiuram compound.

The tire can be built, shaped, molded and cured by various methods which will be readily apparent to those having skill in the art.

Such unvulcanized tread rubber composition (e.g. in a form of an extruded rubber strip) can be applied in the building of the green (unvulcanized) rubber tire in which the uncured, shaped tread is built onto the carcass following which the green tire is shaped and cured.

Alternately, an unvulcanized, or partially vulcanized, tread rubber strip can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Natural rubber-rich rubber compositions were prepared and identified herein as Sample A which contained precipitated silica aggregates together with a silica coupling agent with a conjugated diene-based elastomer host. Experimental Samples B through D also contained a modifier for said precipitated silica aggregates.

In particular, Samples B and D contained 1-octadecanol (modifier) wetting agent and Sample E contained epoxidized soybean oil (modifier), referred to herein as ESO, as a wetting agent, said modifiers considered herein as hydrophobating the precipitated silica aggregates to form a composite thereof in the absence of a sulfur curative.

In particular, Samples A and B contained a bis(3-triethoxysilylpropyl) polysulfide coupling agent (referred to herein as Coupling agent "A") and Samples C, D and E contained a ω-mercaptoalkylalkoxysilane coupling agent (referred to herein as Coupling agent "B").

The rubber compositions were prepared by mixing the ingredients in sequential mixing steps in one or more internal rubber mixers.

The rubber compositions are illustrated in the following Table 1.

TABLE 1

| | Parts by Weight Samples | | | | |
|---|---|---|---|---|---|
| Component | A | B | C | D | E |
| First mixing step (to about 160° C.) | | | | | |
| Natural rubber[1] | 100 | 100 | 100 | 100 | 100 |
| Stearic acid[2] | 2 | 2 | 2 | 2 | 2 |
| Octadecanol (alcohol)[3] | 0 | 4.4 | 0 | 2.93 | 0 |
| Epoxidized soybean oil(ESO)[4] | 0 | 0 | 0 | 0 | 2.93 |
| Silica[5] | 35 | 35 | 35 | 35 | 35 |
| Coupling agent (A)[6] | 2.8 | 2.8 | 0 | 0 | 0 |
| Coupling agent (B)[7] | 0 | 0 | 2.8 | 2.8 | 2.8 |
| Second Mixing Step (to about 170° C.) | | | | | |
| Silica[5] | 20 | 20 | 20 | 20 | 20 |
| Coupling agent (A)[6] | 1.6 | 1.6 | 0 | 0 | 0 |
| Coupling agent (B)[7] | 0 | 0 | 1.6 | 1.6 | 1.6 |
| Third Mixing Step (to about 160° C.) (Optional Mixing Step) | | | | | |
| Re-mixing only, no additional ingredient added Fourth Mixing Step (to about 110° C.) | | | | | |
| Sulfur | 1.5 | 1.5 | 2 | 2 | 2 |
| Accelerator[8] | 1.25 | 1.25 | 1.25 | 1.25 | 1.25 |
| Zinc oxide | 2 | 2 | 2 | 2 | 2 |

[1]Cis 1,4-polyisoprene dry natural rubber
[2]Primarily stearic acid comprised of stearic acid, palmitic acid and oleic acid
[3]Obtained as Stearyl alcohol CO-1895 ™ from Procter & Gamble
[4]Obtained as PLASTHALL ™ ESO from C P Hall Company
[5]Obtained as Zeosil ™ 1165 MP from Rhodia
[6]A coupling agent as a bis(3-triethoxysilylpropyl)polysulfide, understood to contain an average of about 3.4 to about 3.8 connecting sulfur atoms in its polysulfidic bridge, contained on a carbon black carrier in a 50/50 weight ratio as a composite thereof as X50S ™ from Degussa and reported in the Table on a basis of the coupling agent itself rather than the carbon black composite.
[7]A liquid ω-mercaptoalkylalkoxysilane coupling agent having blocked mercapto moiety from GE Silicones
[8]Of the sulfenamide type In particular the rubber compositions are prepared by mixing the ingredients, other than the sulfur and said accelerators in first and second sequential non-productive mixing steps in an in internal rubber mixer followed by mixing in a productive mixing step, also in an internal rubber mixer, in which the sulfur and said accelerators are added.

The mixed ingredients were dumped from each of the respective internal rubber mixers, sheeted from an open mill roll and allowed to cool down to 40° C., or lower, prior to the next mixing step.

The following Table 2 illustrates cure behavior and various physical properties of rubber Samples A through D based upon the basic recipe of Table 1.

TABLE 2

| | Samples | | | | |
|---|---|---|---|---|---|
| | A | B | C | D | E |
| Coupling agent A | 4.4 | 4.4 | 0 | 0 | 0 |
| Coupling agent B | 0 | 0 | 4.4 | 4.4 | 4.4 |

TABLE 2-continued

|  | Samples | | | | |
| --- | --- | --- | --- | --- | --- |
|  | A | B | C | D | E |
| Octadecanol wetting agent | 0 | 4.4 | 0 | 2.93 | 0 |
| Epoxided soybean oil wetting agent | 0 | 0 | 0 | 0 | 2.93 |
| Physical Properties | | | | | |
| ML1 + 4, (100° C.), Mooney viscosity | 71 | 54 | 58 | 49 | 49 |
| ATS[1] (cured at 160° C. for 14 minutes) | | | | | |
| Tensile strength (MPa) | 21.09 | 20.87 | 21.75 | 21.68 | 22.92 |
| Elongation at break (%) | 476 | 491 | 526 | 519 | 519 |
| 300% modulus (MPa) | 11.36 | 11.08 | 10.18 | 10.56 | 11.34 |
| Rebound (%), 100° C. | 66.2 | 68 | 66.4 | 67.9 | 67.5 |
| Shore A hardness, 100° C. | 58.1 | 56.7 | 58.6 | 59.6 | 60.5 |
| RPA[2], 100° C. (cured at 160° C. for 16 minutes) | | | | | |
| Storage modulus G' at 1% strain (kPa) | 2061 | 1812 | 1913 | 1875 | 1992 |
| Storage modulus G' at 10% strain (kPa) | 1516 | 1335 | 1448 | 1507 | 1643 |
| Storage modulus G' at 50% strain (kPa) | 1012 | 958 | 1063 | 1067 | 1176 |
| Tan delta at 10% strain | 0.090 | 0.079 | 0.080 | 0.057 | 0.047 |
| DIN[3] (relative volume loss) | 144 | 92 | 148 | 113 | 119 |

[1]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[2]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al., Rubber World, June 1992 and January 1997, as well as Rubber & Plastics News, April 26 and May 10, 1993.
[3]DIN abrasion (in terms of relative volume loss compared to a control) according to DIN 53516.

It can be seen from Table 2 that, as compared to coupling agents A or B alone for Examples A and C, respectively, the use of additional wetting agents (octadecanol or epoxidized soybean oil for natural rubber-rich Examples B, D and E), are seen to provide lower compound Mooney viscosities for the respective rubber Samples. This is considered herein to be significant because lower Mooney viscosity indicates better expected processability and a special associated benefit for a natural rubber-rich composition in order to present a reduced degradative hot high shear mixing history for the natural rubber itself.

From Table 2 it can also be seen that, lower tan delta values and higher percentage of rebound at 100° C. were obtained as a result of using additional 1-octadecanol or ESO (epoxidized soybean oil). This is considered herein to be significant because lower tan delta and higher rebound values at elevated temperature can predict that the tires having treads prepared from these compounds, made using the processes described herein, will have lower predictive rolling resistance and the associated vehicle would therefore have better fuel economy.

From Table 2 it can also be seen that higher abrasion resistance in the sense of lower DIN volume loss (Samples B, D and E) were obtained, as compared to the Control Sample A, by additional octadecanol or ESO. This is considered herein to be significant because lower DIN volume loss can predict that the tires made from these compounds, made using the processes described herein, will have better abrasion resistance and hence have longer tread wear life.

Variations in the present invention are possible in light of the description of it provided herein.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process of preparing a rubber composition which comprises the steps of:
   (A) blending, based upon parts by weight per 100 parts by weight rubber (phr):
      (1) 100 phr of at least one conjugated diene-based elastomer consisting essentially of:
         (a) from about 50 to about 100 phr of dry cis 1,4-polyisoprene rubber, and
         (b) from zero to about 50 phr of at least one additional conjugated diene-based elastomer selected from at least one of cis 1,4-polybutadiene rubber, styrene-butadiene rubber, styrene-isoprene-butadiene rubber, styrene-isoprene rubber, isoprene-butadiene rubber and high vinyl-polybutadiene rubber having a vinyl 1,2- content in a range of from about 30 to about 80 percent,
      (2) from about 25 to about 120 phr of reinforcing filler comprised of:
         (a) from about 20 to about 115 phr of precipitated silica aggregates, and
         (b) from about 5 to about 70 phr of rubber reinforcing carbon black, and
   (B) thereafter adding and blending sulfur curative therewith; characterized in that said precipitated silica aggregates are treated with a modifier selected from a fatty alcohol and epoxidized soybean oil and their mixtures in the absence of and prior to said addition of said sulfur curative addition by pre-treating said precipitated silica aggregates with said modifier to form a pre-formed silica/modifier composite as a reaction product thereof and blending said pre-formed silica/modifier composite with said conjugated diene-based elastomer(s), followed by reacting said pre-formed silica/modifier composite with a coupling agent in situ within said conjugated diene-based elastomer(s) to form a silica/modifier/coupling agent composite thereof wherein said fatty alcohol is selected from at least one of 1-octanol, 1-decanol, 1-dodecanol, 1-tetradecanol, 1-hexadecanol, 1-octadecanol, 1-eicosanol, 1-docosanol, 1-tetracosanol, 1-hexacosanol, or 1-octacosanol, and their mixtures;

wherein said coupling agent is selected from bis(ω-trialkoxysilylalkyl) polysulfide having an average of from about 2 to about 4 connecting sulfur atoms in its polysulfidic bridge, or ω-mercaptoalkyltrialkoxysilane, or ω-mercaptoalkyltrialkoxysilane having its mercapto moiety blocked from pre-reacting with hydroxyl groups contained on said precipitated silica aggregates prior to unblocking said blocked mercapto moiety.

2. The process of claim 1 which additionally comprises sulfur curing the rubber composition at an elevated temperature.

3. The process of claim 1 which further comprises preparing a tire by preparing a tire assembly comprised of a rubber tire having a component of said rubber composition and sulfur curing said tire assembly.

4. A sulfur cured rubber composition prepared by the process of claim 2.

5. A tire prepared by the process of claim 3.

6. A tire having at least one component comprised of the sulfur cured rubber composition of claim 5.

7. A tire having a tread comprised of the sulfur cured rubber composition of claim 4.

8. The process of claim 1 wherein said coupling agent is a bis(ω-trialkoxyalkylsilyl) polysulfide having an average of from about 2 to about 4 connecting sulfur atoms in its polysulfidic bridge.

9. The process of claim 8 wherein said bis(ω-trialkoxysilylalkyl) polysulfide coupling agent is comprised of a bis(3-triethoxysilylpropyl) polysulfide.

10. The process of claim 8 wherein, for said bis(ω-trialkoxysilylalkyl) polysulfide coupling agent:

(A) the alkyl group of its silylalkyl moiety is selected from saturated alkyl groups which contain from 2 to 6 carbon atoms, and (B) at least one of the alkyl groups of its trialkoxy moiety is an ethyl group and the remaining alkyl group(s) of its trialkoxy moiety are independently selected from an ethyl group and from a higher saturated alkyl group containing from 3 to about 18 carbon atoms;

wherein at least one of said higher saturated alkyl groups optionally contains one or more polar functional groups selected from:

(1) pendent polar functional groups selected from ether, amine, ester, ketone, epoxy and hydroxy groups pendently attached to at least one of said higher alkyl group(s), and (2) polar functional groups contained within at least one of said higher alkyl group(s) selected from ether, amine, ester, ketone, epoxy and hydroxy groups, and wherein said higher saturated alkyl group is optionally a cyclic alkyl group containing 3 to 8 carbon atoms.

11. The process of claim 1 wherein said coupling agent is a ω-mercaptoalkyltrialkoxysilane.

12. The process of claim 11 wherein, for said ω-mercaptoalkyltrialkoxysilane;

(A) the alkyl group is selected from saturated alkyl groups which contain from 2 to 6 carbon atoms, and (B) at least one of the alkyl groups of its trialkoxy moiety is an ethyl group and the remaining alkyl group(s) of its trialkoxy moiety are independently selected from an ethyl group and from a higher saturated alkyl group containing from 3 to about 18 carbon atoms, and wherein at least one of said higher saturated alkyl groups optionally contains one or more polar functional groups selected from:

(1) pendent polar functional groups selected from ether, amine, ester, ketone, epoxy and hydroxy groups pendently attached to at least one of said higher alkyl group(s), and (2) polar functional groups contained within at least one of said higher alkyl group(s) selected from ether, amine, ester, ketone, epoxy and hydroxy groups, and wherein said higher saturated alkyl group is optionally a cyclic alkyl group containing from 3 to 8 carbon atoms.

13. The process of claim 1 wherein said co-mercaptoalkyltrialkoxysilane is a ω-mercaptoalkyltrialkoxysilane having its mercapto moiety blocked from pre-reacting with hydroxyl groups contained on said precipitated silica aggregates prior to unblocking said blocked mercapto moiety.

14. The process of claim 13 wherein said co-mercaptoalkyltrialkoxysilane is comprised of at least one of 3-octanoylthio-1-propyltrimethoxysilane, 3-octanoylthio-1-propyltriethoxysilane, 3-octanoylthio-1-propylethoxy(2-methyl-1,3-propanedioxyl)silane and their mixtures.

15. The process of claim 1 wherein said modifier is a fatty alcohol selected from at least one of 1-octanol, 1-decanol, 1-dodecanol, 1-tetradecanol, 1-hexadecanol, 1-octadecanol, 1-eicosanol, 1-docosanol, 1-tetracosanol, 1-hexacosanol, or 1-octacosanol, and their mixtures.

16. The process of claim 1 wherein said modifier is an epoxidized soybean oil.

17. The process of claim 1 wherein said cis 1,4-polyisoprene rubber is natural rubber.

* * * * *